United States Patent [19]

Gose et al.

[11] Patent Number: 4,707,780
[45] Date of Patent: Nov. 17, 1987

[54] METHOD AND APPARATUS FOR REDUCING TRACK ERRORS IN COMPUTER CONTROLLED MACHINE TOOLS OR INDUSTRIAL ROBOTS

[75] Inventors: Horst Gose; Wolfgang Papiernik, both of Erlangen, Fed. Rep. of Germany

[73] Assignee: Siemens Aktiengesellschaft, Munich, Fed. Rep. of Germany

[21] Appl. No.: 22,551

[22] Filed: Mar. 6, 1987

Related U.S. Application Data

[63] Continuation of Ser. No. 708,443, Mar. 5, 1985, abandoned.

[30] Foreign Application Priority Data

Mar. 8, 1984 [DE] Fed. Rep. of Germany ....... 3408551

[51] Int. Cl.$^4$ .................. G05B 13/04; G06F 15/46
[52] U.S. Cl. .................................. 364/176; 318/632; 364/149; 364/474; 364/513; 364/553
[58] Field of Search .............. 364/513, 474, 475, 148, 364/149, 150, 151, 176, 177, 553, 164, 165; 318/561, 563, 565, 632

[56] References Cited

U.S. PATENT DOCUMENTS

| | | | |
|---|---|---|---|
| 4,130,787 | 12/1978 | Allaire et al. | 318/565 |
| 4,195,337 | 3/1980 | Bertrand et al. | 364/151 |
| 4,286,318 | 8/1981 | Immink et al. | 364/553 X |
| 4,338,659 | 7/1982 | Kurakake | 364/150 |
| 4,385,362 | 5/1983 | Arcara | 364/151 X |
| 4,395,752 | 7/1983 | Hirosawa | 364/553 X |
| 4,451,878 | 5/1984 | Shigemasa | 364/553 X |
| 4,563,734 | 1/1986 | Morl et al. | 364/553 X |

FOREIGN PATENT DOCUMENTS

2729372 4/1979 Fed. Rep. of Germany .

Primary Examiner—Joseph Ruggiero
Attorney, Agent, or Firm—Kenyon & Kenyon

[57] ABSTRACT

In a computer-controlled machine tool, an auxiliary filter is inserted into the reference value channel of the drive control circuit, which filter has a transfer function approximately the inverse of that of the corresponding drive control circuit.

4 Claims, 1 Drawing Figure

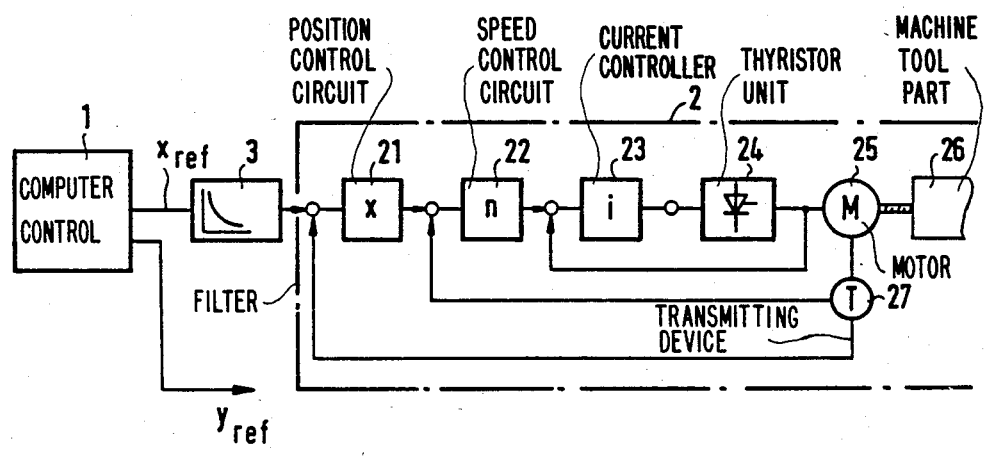

METHOD AND APPARATUS FOR REDUCING TRACK ERRORS IN COMPUTER CONTROLLED MACHINE TOOLS OR INDUSTRIAL ROBOTS

This application is a continuation of application Ser. No. 708,443 filed Mar. 5, 1985, abandoned.

BACKGROUND OF THE INVENTION

This invention relates to computer controlled machine tools and industrial robots in general and more particularly to a method for reducing track errors in computer controlled machine tools or industrial robots, in which distance reference values for the drive control circuits supplied by the computer in a reference value channel determine the track and the track velocity.

It is already known in numerically controlled machine tools to monitor the so-called drag error, i.e., the difference between reference and actual position and, if the drag distance becomes excessive, to initiate countermeasures (see, for instance, DE-AS No. 27 29 372). In this connection, monitoring in such a manner that the ratio of the partial actual values supplied by a distance measuring system and the corresponding speed reference value is formed is also known. These methods have found acceptance; in principle, however, they can become active only if the unpermissible deviation has already occurred. It would be substantially more advantageous if deviations between the desired and the actual track would not occur, as far as possible, from the start.

Accordingly, it is the object of the present invention to describe a method with which the deviation of the reference from the actual track, i.e., the contour error, can be prevented as far as possible, from the start.

SUMMARY OF THE INVENTION

According to the present invention, this problem is solved by inserting a preliminary filter in the reference value channel of each drive control circuit, which filter becomes effective in the event of track vector changes and which has essentially the inverse transmission characteristic of the corresponding drive control loop.

By means of this reference input distortion, the behavior of the loop is compensated or corrected in such a direction that a minimum contour error results.

Therefore, the transfer behavior of the entire control loop, among which also the auxiliary filter is then also counted, is changed intentionally. Theoretically, the overall transfer function can be chosen to be 1 if an exactly inverse model of the loop is inserted as an auxiliary filter; for practical reasons, however, such as a controller output limitation, one will want to approach the behavior of first and second order delay sections.

It is assured thereby that even with conventional controllers (P, PID structure) a control behavior is obtained which could otherwise be achieved only with higher order controllers.

BRIEF DESCRIPTION OF THE DRAWINGS

The single FIGURE is a block diagram of the X drive of a machine tool with an auxilary filter inserted accordng to the present invention.

DETAILED DESCRIPTION

The overall control loop schematically indicated in the drawing is a d-c drive 25 which drives a machine part 26, for instance, the feed slide of one axis of a machine tool, for instance, the x axis. This motor 25 is fed by a thyristor unit 24 which receives its control commands from a current controller 23. A speed control circuit 22 is superimposed onto this current controller 23. In turn a position control circuit 21 is superimposed on the speed control circuit. The actual distance and speed values are derived from a transmitting device 27 which is coupled to the motor 25. The distance reference values xref for the distance controller 21 are provided by a computer control 1 according to the user program loaded. Specifically, the speed at which the supplied values are changed also determines the track velocity in the corresponding axis. At the same time, this computer control 1 also furnishes reference values for further axes such as the reference value yref for the y axis.

Computer controls of this kind are described, for instance, in Siemens-Zeitschrift, 1975, No. 6, pages 346 to 351 or in the DE-AS cited above.

In addition, an auxiliary filter 3 is inserted into the reference value channel of each reference distance value output. Filter 3 becomes effective in the event of changes of the track vector, be it as to direction or as to velocity. The filter 3, which for the sake of simplification is drawn apart from the computer control 1, represents a model of the loop 2 which is largely inverted and is stored there. Each distance reference value must go through this model in the output, so that these values are then suitably distorted in such a manner that a behavior of the overall control circuit is obtained which leads to minimum contour distortions. In the theoretically optimum case, this would be a transfer characteristic of 1, i.e., the auxiliary filter 3 would have a behavior exactly thc inverse to the behavior of the rest of the control circuit 2. Since this can generally not be realized for practical reasons, the auxiliary filter 3 is designed so that transmission factors in time always still play a certain role, but otherwise attention is given to the fact that the contour error be kept as small as possible.

In the foregoing specification, the invention has been described with reference to a specific exemplary embodiment thereof. It will, however, be evident that various modifictions and changes may be made thereunto without departing from the broader spirit and scope of the invention as set forth in the appended claim. The specification and drawing are, accordingly, to be regarded in an illustrative rather than in a restrictive sense.

What is claimed is:

1. A method for reducing track errors in computer controlled machine tools or industrial robots in which distance reference values for the drive control circuits supplied by a computer in a reference value channel determine the track and the track velocity, wherein track direction and track velocity are expressed by a track vector and wherein the drive control circuits include controllers of low order, further comprising inserting an auxiliary filter in the reference value channel of each drive control circuit, which filter has approximately the inverse transfer behavior of the associated drive control circuit, feeding the auxiliary filter with control signals corresponding to changes in the track ventor and switching the auxiliary filter directly between the output of the computer and the reference value input of the respective drive control circuit.

2. Apparatus for reducing track errors in computer controlled machine tools or industrial robots in which distance reference values for drive control circuits supplied by a computer in a reference value channel determine the track and the track velocity, wherein track direction and track velocity are expressed by a track vector and wherein the drive control circuits include controllers of low order, further comprising an auxiliary filter provided in the reference value channel of each drive control circuit, which filter has approximately the inverse transfer behavior of the associated drive control circuit, the auxiliary filter being respectively fed with control signals corresponding to changes in the track vector and further comprising means for switching the auxiliary filter directly between the output of the computer and the reference value input of the respective drive control circuit.

3. The apparatus recited in claim 2 wherein the controller of low order comprises at least one P-controller.

4. The apparatus recited in claim 2 wherein the controller of low order comprises at least one PID-controller.

* * * * *